July 22, 1930.  O. C. TRAVER  1,771,361
PROTECTIVE APPARATUS
Filed Aug. 5, 1927  2 Sheets-Sheet 1
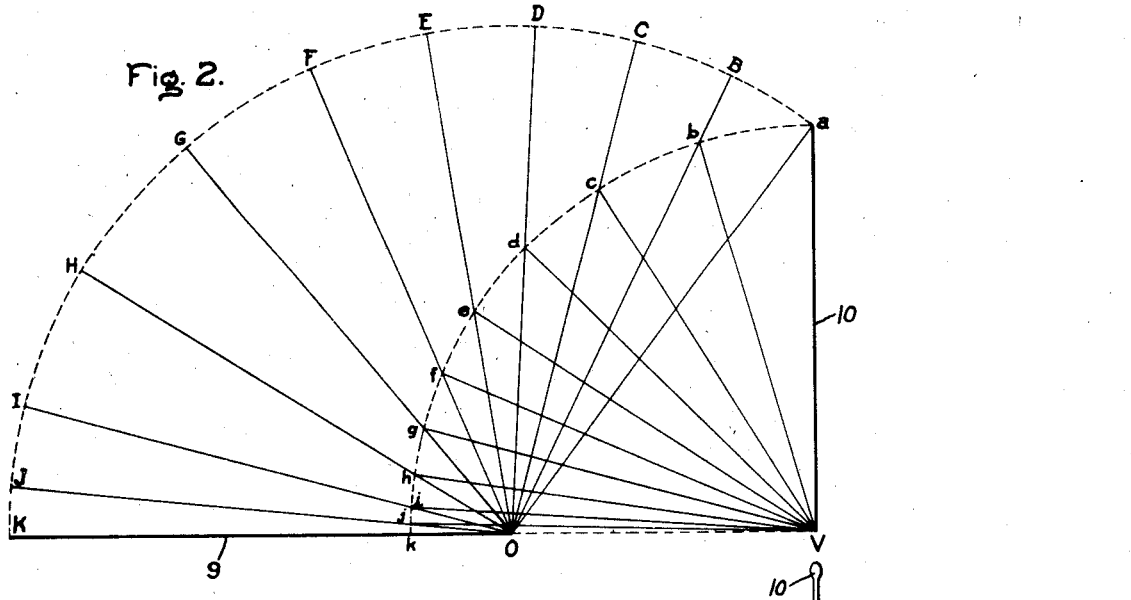
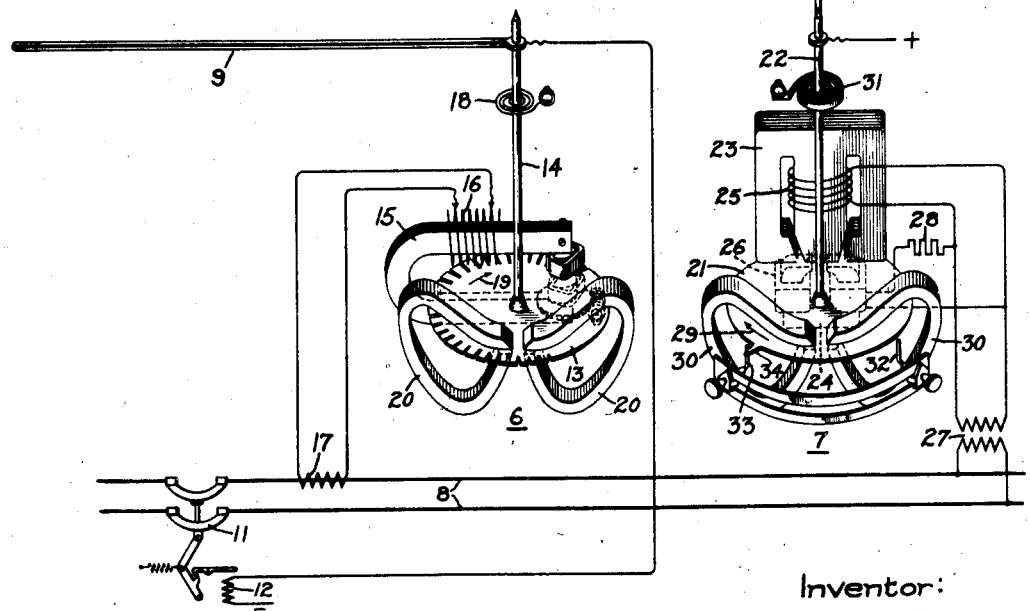
Inventor:
Oliver C. Traver,
by *Alexander F. Lent*
His Attorney.

July 22, 1930.  O. C. TRAVER  1,771,361
PROTECTIVE APPARATUS
Filed Aug. 5, 1927  2 Sheets-Sheet 2

Inventor:
Oliver C. Traver,
by
His Attorney.

Patented July 22, 1930

1,771,361

UNITED STATES PATENT OFFICE

OLIVER C. TRAVER, OF SCHENECTADY, NEW YORK, ASSIGNOR TO GENERAL ELECTRIC COMPANY, A CORPORATION OF NEW YORK

PROTECTIVE APPARATUS

Application filed August 5, 1927. Serial No. 210,970.

My invention relates to improvements in protective apparatus for electric circuits and more particularly to improvements in relays especially such as have a time of operation dependent on the distance between the relay and a fault whereby so to modify the operating characteristic of the relays as to obtain a more selective and reliable operation.

My invention will be better understood from the following description when considered in connection with the accompanying drawing and its scope will be pointed out in the appended claims.

Figure 3:
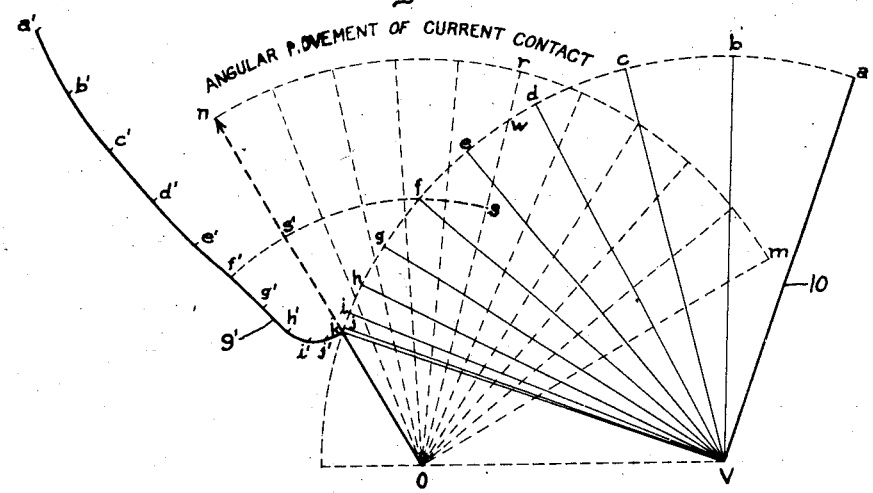
Figure 4:
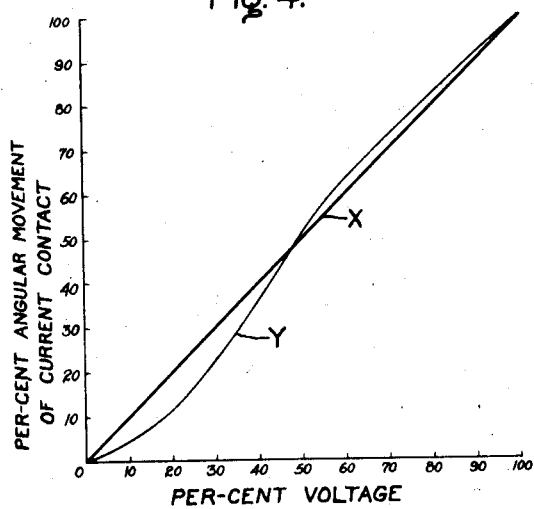

In the accompanying drawing, Fig. 1 illustrates an embodiment of my invention partly in diagram and partly in perspective, Fig. 2 is a diagram illustrating the operation of the embodiment of my invention shown in Fig. 1, Fig. 3 is a diagrammatic illustration of a modification of my invention and the operation thereof, and Fig. 4 illustrates the operating characteristics of the embodiments of my invention shown in Figs. 1 and 3.

In Fig. 1, I have illustrated my invention as embodied in protective apparatus comprising a relay of the so-called distance type, that is, an over-current relay whose time of operation on the occurrence of a fault causing an over-current condition is dependent on the distance between the relay and the fault. The particular form of distance relay construction, which I have chosen to illustrate my invention, is disclosed in my United States Letters Patent 1,501,733, dated July 15, 1924. This relay in general comprises two electroresponsive elements 6 and 7 which may be of the induction disk type as shown and which are operative in response to functions of electric quantities, such as the current and the voltage respectively of an electric circuit 8, to control two cooperating contacts 9 and 10 respectively. These contacts may be arranged to control suitable circuit interrupting means, shown as a latched-in circuit breaker 11 having a trip coil 12 or they may be arranged to control indicating or signalling devices as desired.

The current responsive element 6 is illlustrated as of the type disclosed in United States Letters Patent 1,539,812, to C. I. Hall, May 26, 1925. This element as shown comprises a disk 13 of suitable conducting material secured to a suitably mounted rotatable member such as a shaft 14 and inductively associated with a torque exerting or motor element 15 of the shaded pole type. This element has an energizing winding 16 connected to be energized in accordance with the current in the circuit 8 as through a current transformer 17 and tends to rotate the disk 13 against the bias of a spring 18 in the direction indicated by the arrow 19. When the circuit current exceeds a predetermined value such that the torque of the motor element 15 is sufficient to overcome the torque of the spring 18, the disk 13 is rotated at a velocity dependent on the circuit current. For retarding the movement of the disk 13 so as to increase the time, drag magnets 20 may be provided.

The voltage responsive element 7 comprises a disk 21 of suitable conducting material secured to a suitably mounted rotatable member such as a shaft 22 and inductively associated with a torque exerting or motor element comprising magnetic members 23 and 24. These are arranged to be energized by windings 25 and 26 connected in parallel with each other and in shunt relation to the circuit 8 by suitable means such as a potential transformer 27. The currents flowing in the windings 25, 26 depend on the voltage of the circuit 8 and are displaced in phase in accordance with the relative impedances of the windings. The phase relation may be further varied by the interposition of suitable means such as a resistance 28 in the circuit of one of the windings 26 for example. The shifting magnetic field produced by the interaction of the magnetic members 23, 24 induces currents in the disk 21 and tends to cause the same to rotate in a well known manner. The motor element comprising the members 23 and 24 exerts on the disk 21 a torque which is substantially directly proportional to the square of the voltage of the circuit 8 and tends to turn the disk in the direction indicated by the arrow 29. Damping magnets 30 may be provided to retard the movement of the disk 21. In order that the disk 21 may take a position dependent on the voltage of the circuit 8, the torque exerted by the motor element is opposed by a suitable counter torque means such as a spring 31 which tends to turn the disk in a direction opposite to that shown by the arrow 29. The range of movement of the disk 21 between no voltage and full or normal voltage on the circuit may be controlled by suitable and preferably adjustable stops 32, 33, arranged in the path of movement of a projection 34 on the disk.

In order to modify the operating characteristic of the relay so as to compensate for the voltage square effect of the electro-responsive element 7, the contacts 9 and 10 are mounted for rotation about different axes and one of the contacts 9 for example is made relatively long and arranged on movement of the contacts toward each other to be engaged by the other contact 10 at a point dependent on the relative movements of the contacts. For this purpose the contacts may be coplanar and may be perpendicularly secured directly to the shafts 14 and 22 respectively.

Inasmuch as the angular displacement of the disk 21 from the no voltage position, that is, projection 34 against stop 32, is substantially directly proportional to the square of the voltage, it will be obvious that the movement of the disk 21 and therefore the contact 10 for a given percentage of voltage change is much greater near full or normal voltage than near zero voltage. With the contact arrangement shown in Fig. 1, the effect of this non-uniformity of movement of the voltage actuated contact 10 on the current actuated contact 9 is so compensated that the travel of the current contact 9 and therefore the time necessary to close the contacts for a given excess current condition is substantially as shown by the characteristic curve Y in Fig. 4, that is to say, practically directly proportional to the first power of the voltage. In Fig. 4, the straight line X represents the theoretically desirable linear relation or characteristic between voltage and current contact movement for uniform selectivity throughout the whole voltage range. Thus with either of these characteristics, it will be obvious that where an electric circuit is equipped with distance relays at plurality of points, the tendency for more than one relay to operate on the occurrence of a fault and particularly those near the fault because of crowding due to the effect of the square of the voltage is substantially eliminated.

Referring now to Fig. 2 for further explanation of the operation of the embodiment of my invention shown in Fig. 1, the heavy lines OK and Va represent the positions of the contacts 9 and 10 under normal circuit conditions as shown in Fig. 1, that is, current below the predetermined value for which the relay element 6 is set to respond and normal voltage, the contacts 9 and 10 being angularly displaced 90°. It is assumed that the voltage contact 10 may have a total angular movement of 90° from normal to zero voltages. Then, for successive decreases of say 10 percent in voltage, the contact 10 assumes the positions $Vb$, $Vc$, $Vd$, etc., $a$, $b$, $c$, $d$, etc. being the respective points of contact with the contact 9 for the different positions $Oa$, $OB$, $OC$, etc. thereof. From this it will be noted that the steps $aB$, $BC$, $CD$, $DE$, and $EF$ in the travel of the current contact 9 are substantially uniform from 100 to 50 percent voltage, that is, from $a$ to $f$. This is also indicated by the approximate parallelism of the upper portion of the curve Y and the line X in Fig. 4. From $f$ to $i$, that is, 50 to 20 percent voltage, the steps $FG$, $GH$, $HI$ in the movement of the current element are greater, but the steps $IJ$, $JK$ from 20 percent to zero voltage, that is $i$ to $j$, decrease. This variation is shown by the intersection of the curve Y with the line X and the divergence therefrom in the lower portion.

It will therefore be obvious that by suitably spacing the axes of rotation of the contacts and/or shaping the contacts in accordance with my invention, any desired over or under compensation or even exact compensation can be obtained. Thus in Fig. 3, I have shown an arrangement whereby the linear relation or characteristic indicated by the line X in Fig. 4 can be obtained by suitably positioning the current and voltage actuated contacts $9'$ and 10 and shaping one of them such as $9'$ for example. In Fig. 3, the positions of the contacts $9'$ and 10 under normal current and voltage conditions are represented by the lines $Va$ and $Oka'$ respectively, the contacts being rotatable about the points O and V. The voltage contact 10 is arranged for an angular movement of 90° as before while the maximum angular movement of the current contact $9'$ is the angle $nOm$. The shape of the curved portion $ka'$ of the current contact $9'$ is obtained as follows: Assuming the circuit voltage to be only 50 percent of normal then the voltage contact 10 would tend to take the position $Vf$ but before reaching this position, in fact somewhere between positions $e$ and $d$, that is 60 and 70 percent voltage, the contact $9'$ would have completed 50 percent of its total movement $nm$, that is to the position $Or$, and if straight would be engaged by the voltage contact 10 at W. To avoid this the portion $ka'$ of the contact $9'$ is so shaped as to have the points of its contacting portion angularly offset from the straight line $Okn$ by angular amounts $f's'$, etc. corresponding to the arc $fs$ of radius $Of$ for the 50 percent condition and other arcs correspondingly determined for the other conditions. Then when the contacts $9'$ and 10 engage each other, the end of the contact 10, corresponding to the $Vf$ or 50 percent voltage position for example, meets the point $f'$ of the contact $9'$ corresponding to 50 percent of the movement of the contact 9′ and similarly for the other points.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. A relay comprising two cooperating contacts mounted for rotation about different axes, one of said contacts being relatively long and arranged on movement of the contacts toward each other to be engaged by the other contact at a point dependent on the relative movements of the contacts, electroresponsive means for rotating the long contact towards the other contact at a velocity dependent on a function of a quantity of an electric circuit, and electroresponsive means for positioning the other contact in accordance with a function of another quantity of the circuit.

2. A relay comprising two cooperating contacts mounted for rotation about different axes, one of said contacts being relatively long and arranged on movement of the contacts toward each other to be engaged by the other contact at a point dependent on the relative movements of the contacts, electroresponsive means for rotating the long contact towards the other contact at a velocity dependent on a function of a quantity of an electric circuit, and electroresponsive means for positioning the other contact in accordance with a function of another quantity of the circuit, said long contact being so shaped that the engagement of the contacts is effected in a time dependent on another function of said other quantity.

3. A relay comprising two cooperating contacts mounted for rotation about different axes, one of said contacts being arranged to be positioned in accordance with a function of an electric quantity and the other contact being arranged to be rotated at a speed dependent on a function of another electric quantity when the magnitude thereof exceeds a predetermined value, the shape of said other contact being such that when said other quantity exceeds the predetermined value the contacts engage each other after a time dependent on a different function of the first mentioned electric quantity.

4. A relay comprising two cooperating contacts mounted for rotation about different axes, one of said contacts being relatively long and arranged on movement of the contacts toward each other to be engaged by the other contact at a point dependent on the relative movements of the contacts, and means for actuating the contacts.

5. A relay comprising two coperating substantially coplanar contacts mounted for rotation about spaced axes substantially perpendicular to the plane of the contacts, one of said contacts being relatively long and arranged on movement of the contacts toward each other to be engaged by the other contact at a point dependent on the relative movements of the contacts, and means for actuating the contacts.

6. In a relay having a plurality of electroresponsive elements, one adapted to be actuated at a velocity dependent on the current of a circuit and another adapted to take a position dependent substantially on the square of the voltage of the circuit, two cooperating contacts arranged for rotation about different axes and to be actuated respectively by said elements, the contact actuated by the current responsive element comprising a relatively long contact portion shaped to compensate for the positioning of the contact operated by the voltage responsive element so that the engagement of said contacts on movement toward each other is effected substantially in accordance with the first power of the voltage.

7. In combination with an electric circuit and circuit interrupting means therefor, means for controlling the interrupting means on the occurrence of abnormal circuit conditions comprising a relay having an electroresponsive movable element connected and arranged to be moved at a velocity dependent on the circuit current when above a predetermined value, an electroresponsive movable element connected and arranged to assume a position dependent on the square of the voltage of the circuit, and two cooperating contacts mounted for rotation about different axes and arranged to be actuated respectively by said current and voltage elements, the current actuated contact having a relatively long curved portion shaped to compensate for the positioning of the voltage actuated contact so that an engagement of the contacts on the occurrence of an abnormal current condition is effected in a time substantially directly proportional to the first power of the voltage.

8. A relay comprising two coperating contacts mounted for rotation about different axes, one of said contacts being relatively long and arranged on movement of the contacts toward each other to be engaged by the other contact at a point dependent on the relative movements of the contacts, means for actuating said contacts comprising an electroresponsive torque exerting element operative in response to current above a predetermined value to rotate the long contact toward the other contact with a velocity dependent on the current and an electroresponsive torque exerting element for positioning the other contact substantially in accordance with the square of the voltage impressed on its winding, the spacing of the axes of rotation of the contacts and the shape of the long contact being such that engagement of the contacts in response to an over-current condition of an electric circuit is effected in a time substantially directly proportional to the first power of the voltage of the circuit.

In witness whereof, I have hereunto set my hand this 4th day of August, 1927.

OLIVER C. TRAVER.